United States Patent
Taubeneck et al.

(10) Patent No.: US 11,100,533 B1
(45) Date of Patent: Aug. 24, 2021

(54) CRYPTOGRAPHICALLY GENERATING CUSTOM AUDIENCES

(71) Applicant: Facebook, Inc., Menlo Park, CA (US)

(72) Inventors: Erik Taubeneck, Brooklyn, NY (US); Michael Randolph Corey, New York, NY (US); Frederick R. Leach, Portola Valley, CA (US); Daniel K. Chapsky, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 47 days.

(21) Appl. No.: 16/132,347

(22) Filed: Sep. 14, 2018

(51) Int. Cl.
*G06Q 30/00* (2012.01)
*G06Q 30/02* (2012.01)
*H04L 9/06* (2006.01)
*H04L 9/08* (2006.01)
*G06Q 50/00* (2012.01)
*G06F 16/23* (2019.01)

(52) U.S. Cl.
CPC ..... *G06Q 30/0248* (2013.01); *G06F 16/2379* (2019.01); *G06Q 30/0269* (2013.01); *G06Q 50/01* (2013.01); *H04L 9/0637* (2013.01); *H04L 9/0643* (2013.01); *H04L 9/0866* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 10,075,298 B2 * | 9/2018 | Struttmann | G06F 21/6218 |
| 10,855,475 B1 * | 12/2020 | Leach | H04L 9/0637 |
| 2010/0306043 A1 * | 12/2010 | Lindsay | G06Q 30/0245 705/14.41 |
| 2015/0213484 A1 * | 7/2015 | Amara | G06Q 30/0246 705/14.45 |
| 2017/0083941 A1 * | 3/2017 | Biswas | G06Q 30/0255 |
| 2018/0082024 A1 | 3/2018 | Curbera et al. | |

(Continued)

FOREIGN PATENT DOCUMENTS

WO   2018064487 A1   4/2018

OTHER PUBLICATIONS

Shrestha etal. User-Controlled Privacy-Preserving User Profile Data Sharing Based on Blockchain. Future Technologies Conference, Nov. 2017. (Year: 2017).*

(Continued)

*Primary Examiner* — Michael Bekerman
(74) *Attorney, Agent, or Firm* — FisherBroyles, LLP (57) ABSTRACT

The disclosed computer-implemented method may include (1) accessing, by a computing device and from a record stored in an immutable distributed ledger, information describing characteristics of a target audience, (2) ascertaining a target audience member identifier of a target audience member by matching information describing characteristics of the target audience member with the information describing characteristics of the target audience, (3) generating a unique and encrypted secure identifier linking an advertiser identifier to the target audience member identifier, and (4) committing the secure identifier to the immutable distributed ledger as an update transaction to the record. Various other methods, systems, and computer-readable media are also disclosed.

20 Claims, 4 Drawing Sheets

(56) References Cited

U.S. PATENT DOCUMENTS

| | | | |
|---|---|---|---|
| 2018/0174137 A1 | 6/2018 | Subbarayan et al. | |
| 2018/0174138 A1 * | 6/2018 | Subbarayan et al. | |
| 2019/0188411 A1 * | 6/2019 | Kroutik | G06F 21/6245 |
| 2019/0238525 A1 * | 8/2019 | Padmanabhan | G06F 21/6245 |
| 2019/0370866 A1 * | 12/2019 | Lawbaugh | H04L 9/0637 |
| 2020/0074461 A1 * | 3/2020 | DeRosa-Grund | G06Q 30/0255 |
| 2020/0084483 A1 * | 3/2020 | Brown | G06Q 30/0246 |

OTHER PUBLICATIONS

Cosset, Damien, "Blockchain: what is in a block?" accessed at https://dev.to/damcosset/blockchain-what-is-in-a-block-48jo, accessed on Sep. 29, 2018, 20 pages.

"Secure Hash Standard(SHS)", Federal Information Processing Standards Publication 180-4, Information Technology Laboratory, National Institute of Standards and Technology, Gaithersburg, MD, accessed at http://dx.doi.org/10.6028/NIST.FIPS.180-4, Aug. 2015, 36 pages.

"Digital Signal Standard(DSS)", Federal Information Processing Standards Publication 186-4, Information Technology Laboratory, National Institute of Standards and Technology, Gaithersburg, MD, accessed on https://nvlpubs.nist.gov/nistpubs/fips/nist.fips.186-4.pdf, Issued Jul. 2013, 130 pages.

* cited by examiner

CRYPTOGRAPHICALLY GENERATING CUSTOM AUDIENCES

BACKGROUND

Social media is a strong source of influence in modern society. Users of social media may spend several hours per day absorbing information from multiple social media sources. For many users, social media may be a predominant source of receiving advertising. As an advertising channel, social media may enable targeting individual social media users and specific groups of social media users because social media users are individually identifiable by respective user identifiers (i.e., user IDs) that are linked to respective personally identifiable identification (PII) of the social media users. As a result, secondary markets for user IDs and respective PII have developed. The secondary markets may enable unscrupulous advertisers to target individual social media users, specific groups of social media users, and large numbers of social media users. The secondary markets may also enable unauthorized use and sharing of user IDs and PII.

This disclosure, therefore, identifies and addresses a need for systems and methods for cryptographically generating custom audiences.

SUMMARY

As will be described in greater detail herein, the instant disclosure describes, in examples, cryptographically generating secure identifiers (secure IDs) that are unique to advertisers, unique in time, and cryptographically signed by publishers. In some examples, a computer-implemented method for cryptographically generating custom audiences may include (1) accessing, by a computing device and from a record stored in an immutable distributed ledger, information describing characteristics of a target audience, (2) ascertaining a target audience member identifier of a target audience member by matching information describing characteristics of the target audience member with the information describing characteristics of the target audience, (3) generating a unique and encrypted secure identifier linking an advertiser identifier to the target audience member identifier, and (4) committing the secure identifier to the immutable distributed ledger as an update transaction to the record.

In examples, the immutable distributed ledger may implement a blockchain methodology configured to store a history of transactions.

In some embodiments, the computer-implemented method may further include receiving, from a second computing device, an instruction to initiate the accessing.

In examples, the information describing characteristics of the target audience may be personally identifiable identification of the target audience. In an embodiment, the information describing characteristics of the target audience may be encrypted with a cryptographic key.

In examples, the secure identifier may be cryptographically signed by the computing device.

In some embodiments, the computer-implemented method may further include sending, to a second computing device, a communication indicating storing of the secure identifier as the update transaction.

In an embodiment, the computer-implemented method may further include disabling use of the secure identifier at least one of (1) after a defined period of time following the generating of the secure identifier or (2) in response to a triggered condition of a smart contract.

In examples, the secure identifier may include information describing at least one of (1) the target audience member identifier, (2) row-level personally identifiable identification describing characteristics of the target audience, (3) an advertiser identifier, an expiration date of the secure identifier, or (4) a digital signature.

In an embodiment, generating the unique and encrypted secure identifier may further include hashing the target audience member identifier with an advertiser identifier to form the secure identifier. In some embodiments, the computer-implemented method may further include (1) receiving, from a second computing device, a request for an access transaction to grant access to the record, (2) sending, to a plurality of node devices of a validation network, a request to validate the access transaction, (3) receiving responses from the plurality of node devices of the validation network, (4) denying the access transaction when any response indicates the access transaction is invalid and (5) executing the access transaction when all responses indicate the access transaction is valid.

In an embodiment, the computer-implemented method may further include (1) receiving, when the access transaction is valid and from the second computing device, the target audience member identifier and a request to send an advertisement to the target audience member associated with the target audience member identifier and (2) sending the advertisement to a user device of the target audience member.

In addition, a corresponding system for cryptographically generating custom audiences may include several modules stored in memory, including (1) an accessing module, stored in the memory, that accesses information describing characteristics of a target audience from a record stored in an immutable distributed ledger, (2) an ascertaining module, stored in the memory, that ascertains a target audience member identifier of a target audience member by matching information describing characteristics of the target audience member with the information describing characteristics of the target audience, (3) a generating module, stored in the memory, that generates a unique and encrypted secure identifier linking an advertiser identifier to the target audience member identifier, and (4) a committing module, stored in the memory, that commits the secure identifier to the immutable distributed ledger as an update transaction to the record.

In some examples, the above-described method may be encoded as computer-readable instructions on a computer-readable medium. For example, a computer-readable medium may include one or more computer-executable instructions that, when executed by at least one processor of a computing device, may cause the computing device to (1) access from a record stored in an immutable distributed ledger, information describing characteristics of a target audience, (2) ascertain a target audience member identifier of a target audience member by matching information describing characteristics of the target audience member with the information describing characteristics of the target audience, (3) generate a unique and encrypted secure identifier linking an advertiser identifier to the target audience member identifier and (4) commit the secure identifier to the immutable distributed ledger as an update transaction to the record.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to cryptographically generating custom audiences. As will be explained in greater detail below, techniques described herein may automatically cryptographically generate secure identifiers (IDs) that may be unique to advertisers, unique in time, and cryptographically signed. In some examples, systems and methods described herein may generate unique and encrypted secure identifiers linking advertiser identifiers to target audience member identifiers having respective personally identifiable identification (PII) matching needs of advertisers. In some examples, an immutable distributed ledger system may be used to secure requests for secure identifiers and communicating the secure identifiers. In some examples, the disclosed systems and methods thus may enable targeting custom audiences with advertising without authorized advertisers knowing which specific social media users are in the custom audiences. The disclosed systems and methods may also enable preventing unauthorized advertisers from using the secure identifiers. Further, the disclosed systems and methods thus may automatically expire the secure identifiers after a period of time to reduce a black market for secure identifiers.

By doing so, the systems and methods described herein may improve the security of computing devices by beneficially eliminating or minimizing secondary markets (i.e., black markets) for user identifiers. Further, the systems and methods described herein may improve the security of computing devices by providing customizable and secure techniques for custom audience targeting, retargeting, and sub-targeting. Also, the systems and methods described herein may improve the security of computing devices by minimizing an amount of audience members' (e.g., users) PII that is provided to advertisers. As such, the provided techniques may advantageously protect audience members by beneficially reducing occurrences of theft, use, and dissemination of PII by unauthorized parties as a result of unauthorized access to PII by unauthorized parties.

Figure 1:
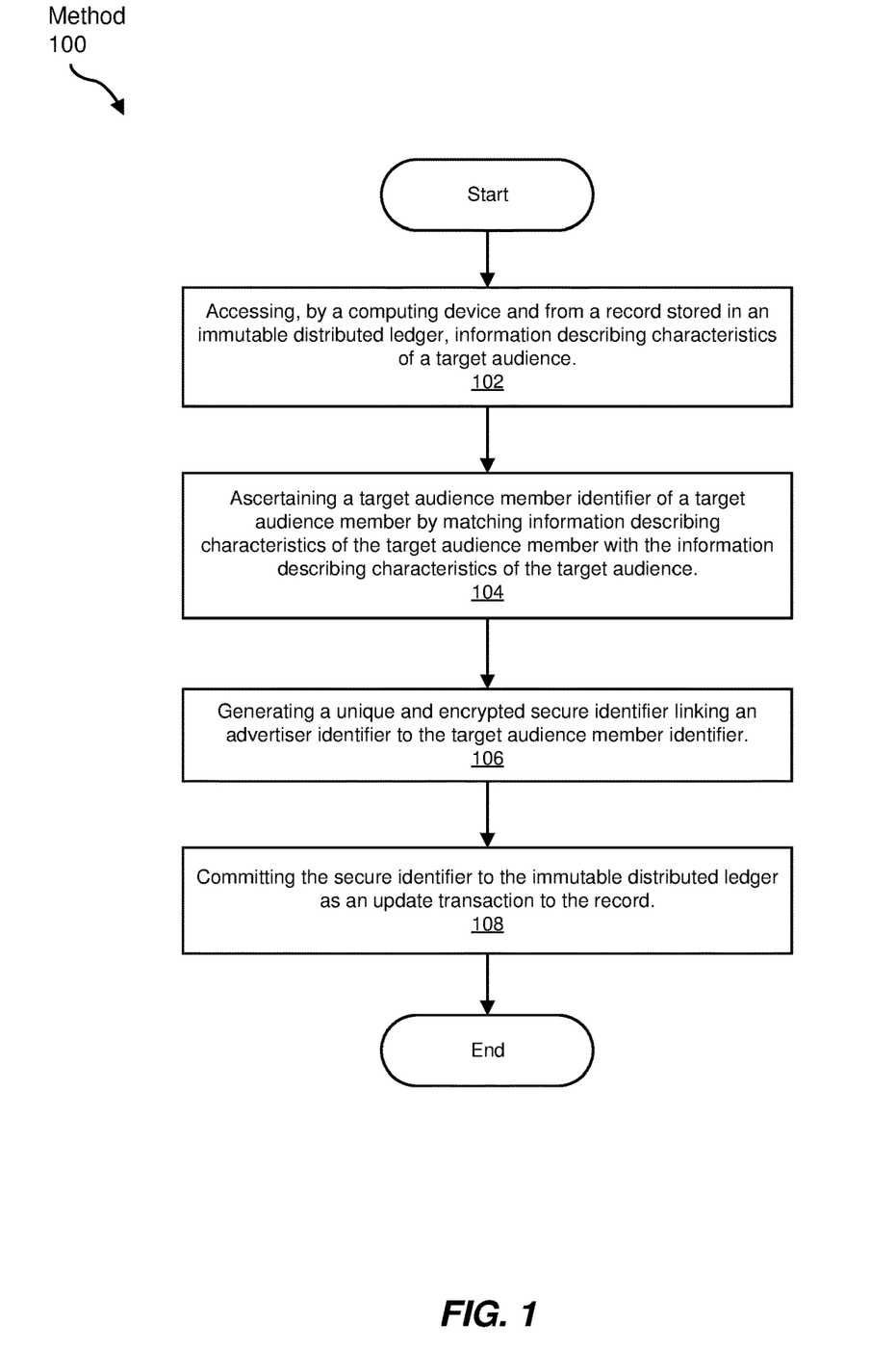
FIG. 1 is a flow diagram of an exemplary method for cryptographically generating custom audiences.
Figure 3:
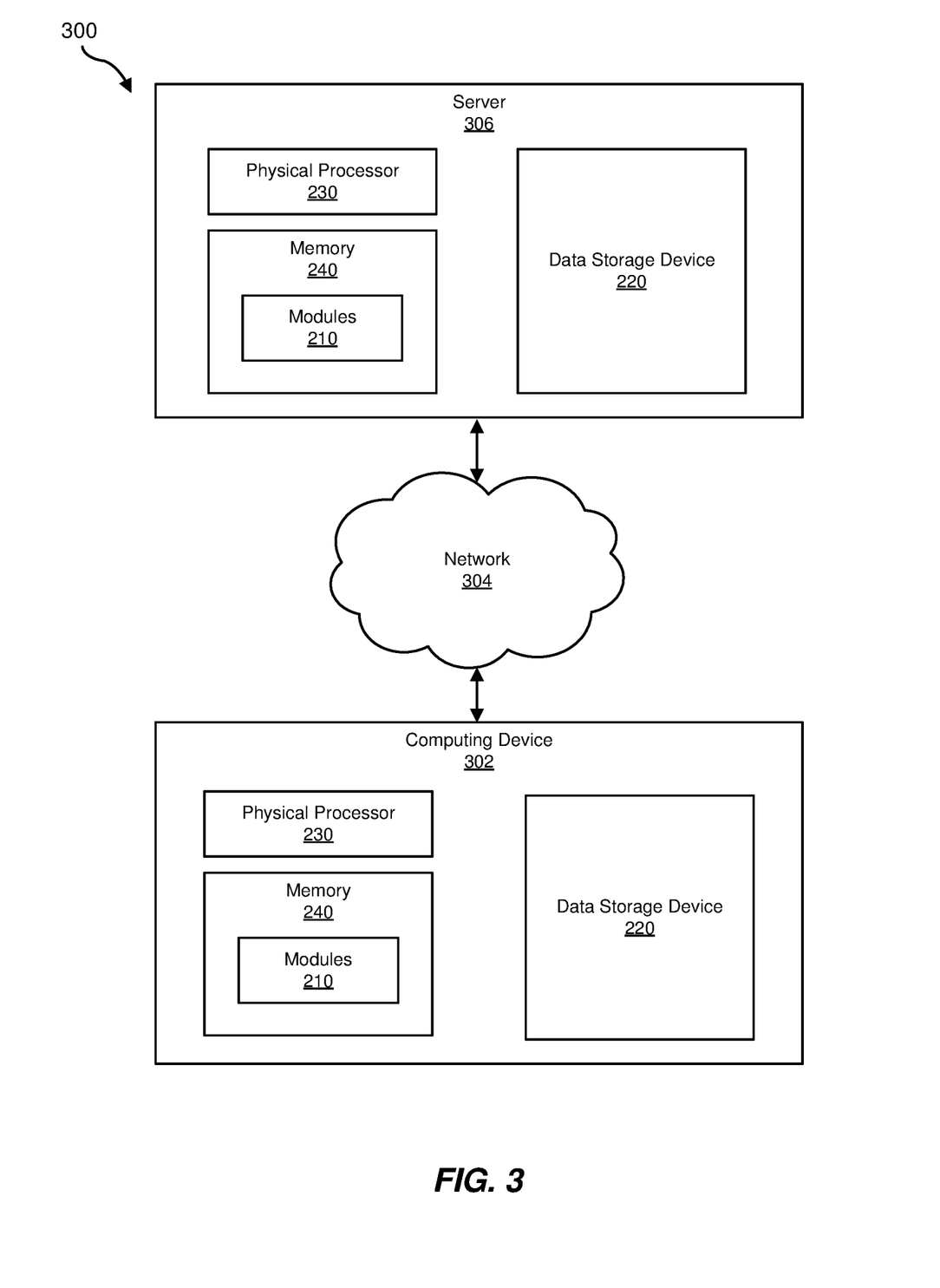
FIG. 3 is a block diagram of an additional example system for cryptographically generating custom audiences.
Figure 4:
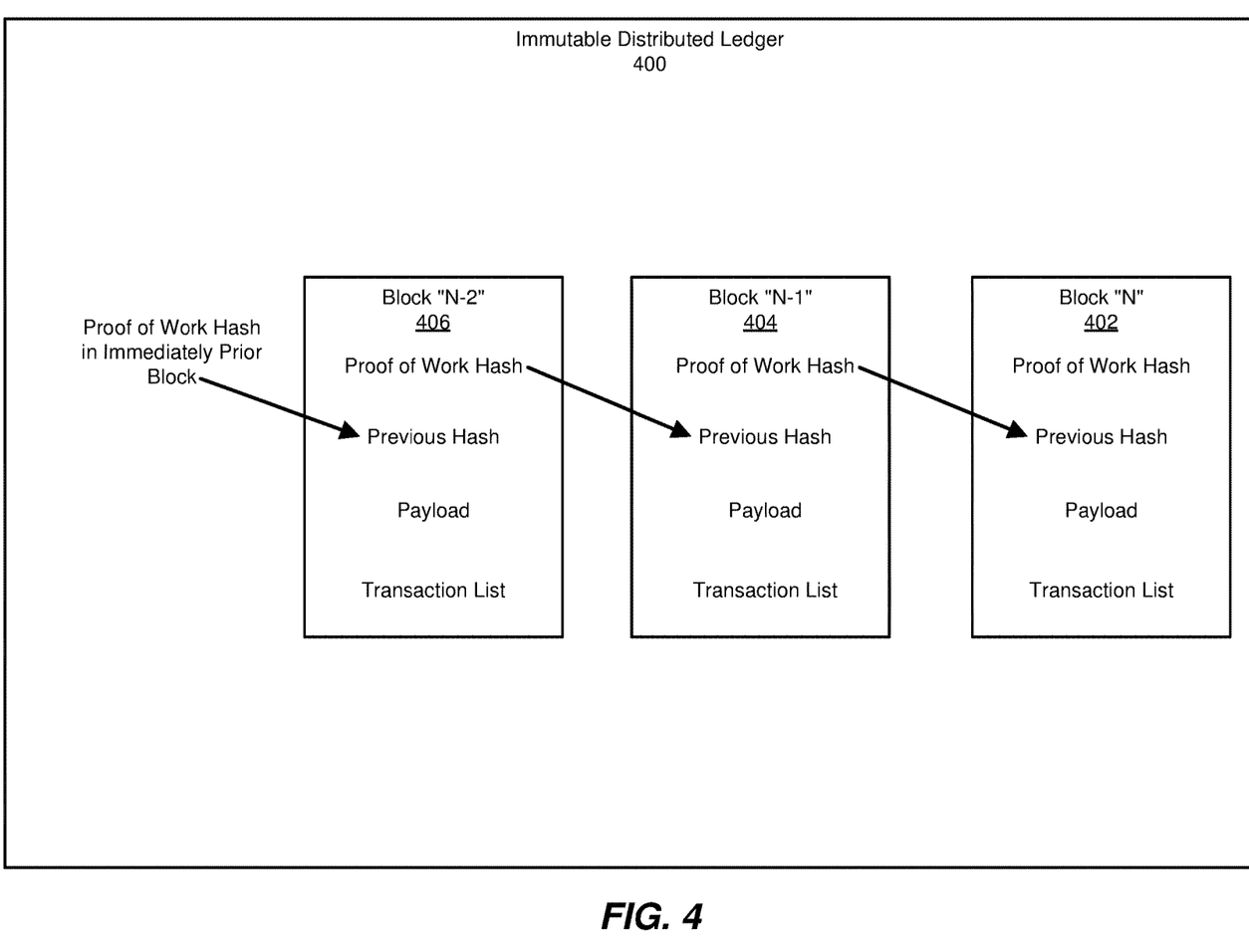
FIG. 4 is a block diagram of an example immutable distributed ledger capable of being used as a part of cryptographically generating custom audiences.

The following will provide, with reference to FIGS. 1 and 4, detailed descriptions of computer-implemented methods for cryptographically generating custom audiences. Detailed descriptions of corresponding example systems will also be provided in connection with FIGS. 2-3.

In some examples, provided are techniques for cryptographically generating secure identifiers that are unique to advertisers, unique in time, and cryptographically signed by publishers. The secure identifiers may be generated by publishers in response to advertisers sending information describing characteristics of target audiences to the publishers. Advertisers may use the information describing the characteristics of target audiences to target a custom audience that meets one or more requirements (e.g., demographics, purchasing behavior, etc.). Publishers may use the received information describing characteristics of target audiences to identify specific social media users having personally identifiable identification that matches the received information describing characteristics of target audiences. In some examples, the PII may be information identifying a person. The PII may be information collected through a direct relationship with a person or entity, such as email addresses, social media interactions, purchase histories, and behaviors while interacting with an application or website, or the like. The specific users in turn are identified by the cryptographically-secured secure identifiers. The cryptographically-secured secure identifiers may be secured using blockchain methodologies and/or public-key cryptography (e.g., public and private key cryptography) and sent to the advertisers. The advertisers may subsequently present, to the publishers, the secure identifiers and specific content (e.g., an advertisement) to be presented by the publishers to the specific users. The publishers may in turn display the specific content to the subset of users identified using the secure identifiers, which may increase the effectiveness of the content by targeting specific users.

FIG. 1 is a flow diagram of an exemplary computer-implemented method 100 for cryptographically generating custom audiences. In some embodiments, advertisers and publishers may use custom audience data to identify a subset of users (e.g., a custom audience) which in turn are identified by cryptographically-secured secure identifiers. The cryptographically-secured secure identifiers may be secured using blockchain methodologies and/or public-key cryptography (e.g., public and private key cryptography). After being presented with the secure identifiers and specific content (e.g., an advertisement) to be presented, the publishers may in turn display the specific content to the subset of users identified using the secure identifiers, which may increase the effectiveness of the content by targeting specific users.

Figure 2:
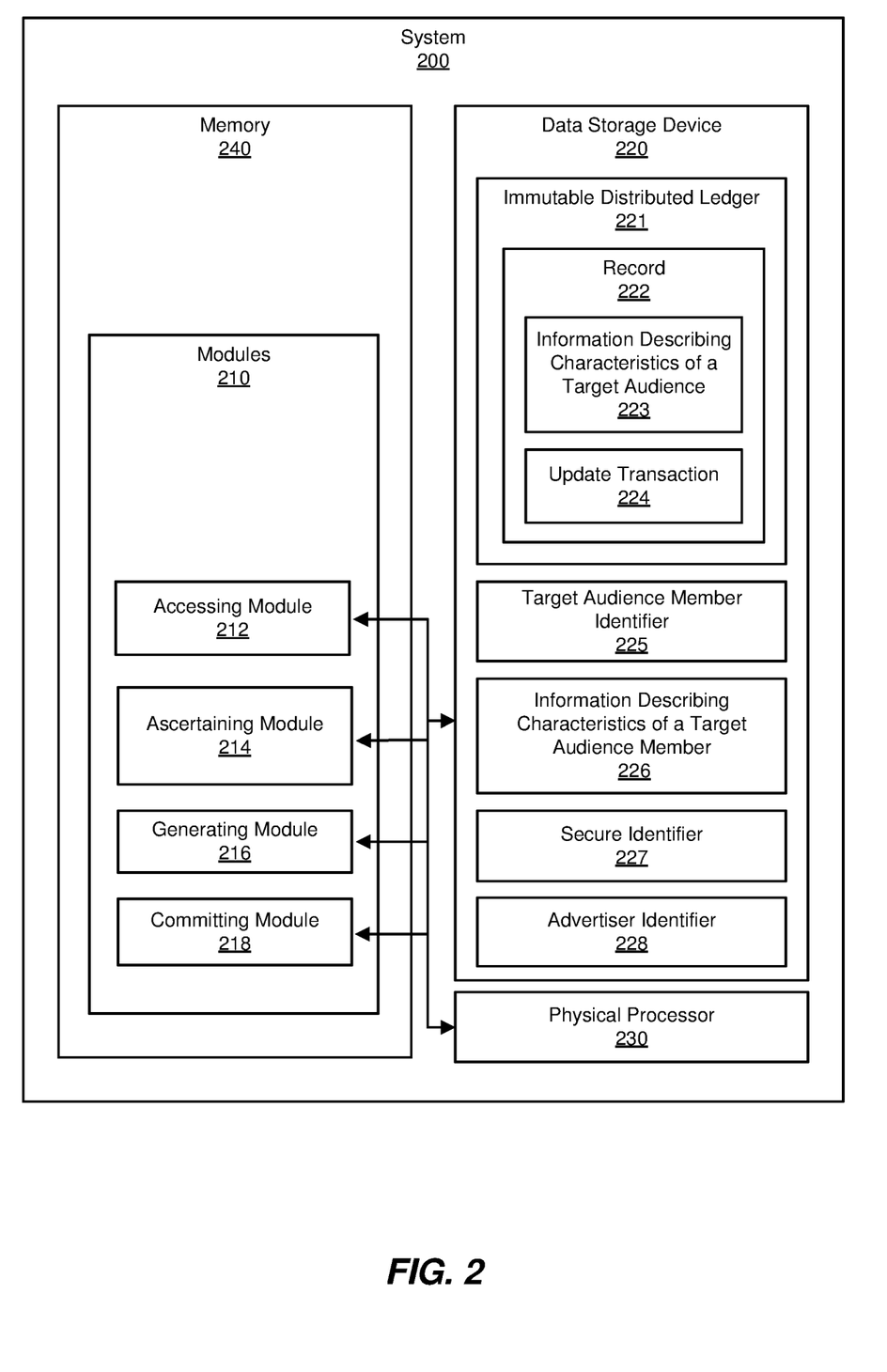
FIG. 2 is a block diagram of an example system for cryptographically generating custom audiences.

The steps shown in FIG. 1 may be performed by any suitable computer-executable code and/or computing system, including the system(s) illustrated in FIGS. 2-3. In one example, each of the steps shown in FIG. 1 may represent an algorithm whose structure includes and/or is represented by multiple sub-steps, examples of which will be provided in greater detail below.

An advertiser may compile custom audience data describing characteristics (e.g., desired PII) of members of a custom audience for one or more products and/or services and may provide, to a publisher, the custom audience data. Custom audience data may include personally identifying information, demographic information, behavioral information, and the like. The custom audience data may be used to identify a specific audience having one or more specific characteristics. An advertiser may provide, to the publisher, the custom audience data to identify a custom audience to show a specific advertisement. The advertiser may want the publisher to display content (e.g., advertisements) to a subset of users identified by the targeting data, thereby increasing the likelihood of marketing to a group of users more likely to be interested in the content than users randomly selected without using the custom audience data.

When sending the custom audience data, the advertiser may encrypt the custom audience data (e.g., with public-key cryptography). The advertiser may send the custom audience data to the publisher with an instruction to initiate the accessing and/or a request that the publisher provide at least one secure identifier of a respective custom audience member to the advertiser. In some examples, the instruction to initiate the accessing may be provided via a smart contract. The advertiser may send the custom audience data to the publisher via a record entered in an immutable distributed ledger, and the publisher may receive the custom audience data (e.g., via accessing the record entered in the immutable distributed ledger). The publisher may decrypt the custom audience data, using, for example, a publisher's private key.

In an embodiment, the information describing characteristics of the target audience may be encrypted with a cryptographic key to provide enhanced security over unencrypted communications. In some embodiments, information describing characteristics of the target audience may be at least a portion of a payload in a respective record stored in the immutable distributed ledger. In examples, the immutable distributed ledger may implement a blockchain methodology configured to store a history of transactions and/or payloads between the advertiser and the publisher. Payloads may include secure identifiers. In some embodiments, the history of transactions may be used to verify a transaction (e.g., a communication) between the advertiser and the publisher. Thus, an advertiser may send an instruction to initiate access to an immutable distributed ledger.

In some embodiments, the method may further include a publisher receiving, from an advertiser, instruction to initiate the access to the distributed ledger. In some examples, the instruction to initiate the accessing may be provided via a smart contract. Accordingly, as illustrated in FIG. 1, at step 102 one or more of the systems described herein may access, by a first computing device (e.g., of a publisher) and from a record stored in an immutable distributed ledger, information describing characteristics of a target audience. The systems described herein may perform step 102 in a variety of ways. In one example, referring to FIG. 2, an accessing module 212 may access from a record 222 stored in an immutable distributed ledger 221, information describing characteristics of a target audience 223. Further details about immutable distributed ledgers may be found herein with reference to FIG. 4.

As used herein, the term "publisher" may describe an entity that distributes electronic content, such as through websites, emails, social media platforms, or the like. Examples of publishers may include social media providers, content providers, online retailers, and the like. Publishers may use PII to target a custom audience that meets one or more requirements (e.g., demographics, purchasing behavior, etc.). In some examples, the PII may be information identifying a person. The PII may be information collected through a direct relationship with a person or entity, such as email addresses, social media interactions, purchase histories, and behaviors while interacting with an application or website, or the like.

As used herein, the term "immutable distributed ledger" may be an electronic ledger that may be publicly shared among users. The immutable distributed ledger may include an unchangeable record of transactions, where each record may include a timestamp and a link to a previous record. In some examples, immutable distributed ledgers may be implemented using a blockchain methodology. The immutable distributed ledger may be managed by a peer-to-peer network (e.g., a network of nodes) collectively adhering to a protocol for inter-node communication and validating new records or blocks. Once recorded, the data in any given block cannot be altered retroactively without alteration of all subsequent blocks, which requires consensus of the network majority. Additional details about immutable ledger technologies are described herein with respect to FIG. 4.

The method may further include the publisher matching information describing characteristics of at least one target audience member (e.g., PII of a target audience member) with the received custom audience data describing characteristics of the target audience. When matches occur, the respective target audience members may be identified (e.g., only to the publisher) as part of the target audience of the advertiser. In an example, matching information describing characteristics of at least one target audience member with the received custom audience data describing characteristics of the target audience may enable targeting, re-targeting, and/or sub-targeting custom audiences for specific advertising. Thus, as illustrated in FIG. 1, at step 104 one or more of the systems described herein may ascertain a target audience member identifier of a target audience member by matching information describing characteristics of the target audience member (e.g., PII of the target audience member) with the information describing characteristics of the target audience. The systems described herein may perform step 104 in a variety of ways. Referring to FIG. 2, in one example, an ascertaining module 214 may ascertain a target audience member identifier 225 by matching information describing characteristics of a target audience member 226 with information describing characteristics of the target audience 223.

Returning to FIG. 1, in some non-limiting examples, target audience members may be social media users, digital media users, internet device users, mobile device users, computer users, users with accounts providing network-based services, and/or subscribers to a network-based service.

Then, the publisher prepares secure identifiers. As illustrated in FIG. 1, at step 106 one or more of the systems described herein may generate a unique and encrypted secure identifier (i.e., a secure ID) linking an advertiser identifier to the target audience member identifier without identifying the target audience member identifier. Thus, the secure identifier may not describe a specific user ID of a social media user. In some examples, secure identifiers may be unique to an advertiser and unique in time. In some embodiments, when a third-party attempts to use the secure identifier, the secure identifier will be unusable by the third-party, the secure identifier will not be decrypted, and/or the attempted transaction by the third-party will not be validated. In some examples, using the unique and encrypted secure identifier may mitigate, and in many cases, eliminate, a black market for target audience member identifiers, as target audience member identifiers may not be sent to advertisers. The systems described herein may perform step 106 in a variety of ways. Referring to FIG. 2, in one example, a generating module 216 may generate a unique and encrypted secure identifier 227 linking an advertiser identifier 228 to target audience member identifier 225.

Returning to FIG. 1, in some embodiments, generating the unique and encrypted secure identifier may further include hashing the target audience member identifier with an advertiser identifier to form the secure identifier. In some embodiments, a hashing function may be used to create the secure identifier.

Protecting PII of specific social media users may be balanced against needs of advertisers. Thus, in some embodiments, the secure identifier may include information describing at least one of (1) the target audience member identifier, (2) row-level personally identifiable identification describing characteristics of the target audience, (3) an advertiser identifier, (4) an expiration date of the secure identifier, and/or (5) a digital signature. In some embodiments, generating the secure identifier may include hashing information describing at least one of (1) the target audience member identifier, (2) row-level personally identifiable identification describing characteristics of the target audience, (3) an advertiser identifier, (4) an expiration date of the secure identifier, and/or (5) a digital signature. In some examples, including and/or hashing row-level personally identifiable identification describing characteristics of the target audience may provide distinct secure identifiers and/or disable cross-device matching when matching multiple rows of personally identifiable identification to a single target audience member identifier. In some examples, including row-level personally identifiable identification describing characteristics of the target audience may prevent providing excess target audience member information to advertisers. To provide user security, secure identifiers may intentionally not include PII of specific users. Including and/or hashing the digital signature may provide the recipient assurance that the message or transaction is created by a known sender, that the sender cannot deny having sent the message, and that the message was not altered during transmission. These techniques may enable protecting privacy of target audience members.

As used herein, the term "digital signature" may be a type of electronic signature that encrypts information or data with a digital code that is computationally infeasible to duplicate and is easy to verify. In some examples, a digital signature may be used for presenting the authenticity of a digital message or transaction. A digital signature may provide the recipient assurance that the message or transaction is created by a known sender, that the sender cannot deny having sent the message, and that the message was not altered during transmission. Cryptographically signing secure identifiers may ensure security and authenticity of secure identifiers.

Returning to FIG. 1, in some examples, the secure identifier may be cryptographically signed by the first computing device. In an embodiment, the secure identifier may be encrypted by the first computing device using, for example, public-key cryptography.

The publisher then may send the secure identifier to the advertiser. As illustrated in FIG. 1, at step 108 one or more of the systems described herein may commit the secure identifier to the immutable distributed ledger as an update transaction to the record. The systems described herein may perform step 108 in a variety of ways. Referring to FIG. 2, in one example, a committing module 218 may commit secure identifier 227 to immutable distributed ledger 221 as an update transaction 224 to record 222.

Returning to FIG. 1, in additional embodiments, the first computing device may create, via an update transaction, a new record in the immutable distributed ledger. The new record may include a payload including information describing the secure identifier. The first computing device (e.g., of the publisher) may send a message, such as an encrypted message, to a second computing device (e.g., of the advertiser) including an identifier of the new record. In some embodiments, the method may further include sending, to the second computing device, a communication indicating storing of the secure identifier as the update transaction. Thus, publishers may inform advertisers of the availability of the secure identifiers.

In some embodiments, the method may further include validating a transaction relating to a record. In some examples, the method may further (1) receiving, from the second computing device, a request for an access transaction to grant access to the record, (2) sending, to a plurality of node devices of a validation network, a request to validate the access transaction, (3) receiving responses from the plurality of node devices of the validation network, (4) denying the access transaction when any response indicates the access transaction is invalid and (5) executing the access transaction when all responses indicate the access transaction is valid. The validation process may ensure that the secure identifier is being used by a properly authorized party and not by an unauthorized party who may have bought the secure identifier on a black market. In some embodiments, the term "node" may refer to any computing device that is connected to the Internet and is part of a peer-to-peer network of a blockchain. In some embodiments, different nodes in a peer-to-peer network of a blockchain may take on different roles to support the blockchain. For example, a full node may obtain a complete copy of the blockchain while a partial or lightweight node may not store the complete blockchain and may rely on a full node to obtain transactions that are necessary and relevant to their operation. Nodes may check for incoming transactions using, for example, a consensus protocol, and may confirm and validate transactions, putting them into blocks to add to the blockchain.

In some examples, the method may further include (1) receiving, when the access transaction is valid and from the second computing device, the target audience member identifier and a request to send an advertisement to the target audience member associated with the target audience member identifier and (2) sending the advertisement to a user device of the target audience member. Thus, advertisers and publishers may use custom audience data to identify a subset of users (e.g., a custom audience) which in turn are identified by cryptographically-secured secure identifiers. After being presented with the secure identifiers and specific content (e.g., an advertisement) to be presented, the publishers may in turn display the specific content to the subset of users identified using the secure identifiers, which may increase the effectiveness of the content by targeting specific users.

In some examples, the advertiser may use the secure identifier as a part of targeted advertising activities. In some examples, the advertiser may send the secure identifier to the publisher in a request that the publisher send at least one specific advertisement to the target audience member associated with the secure identifier. The publisher may decrypt the secure identifier to identify the target audience member identifier and/or to verify that the publisher signed the secure identifier. In some examples, the publisher may then present the at least one specific advertisement to the target audience member associated with the secure identifier, such as by causing display of the at least one specific advertisement on a user display (e.g., of a device associated with the target audience member associated with the secure identifier). Using the secure identifier to identify the target audience member associated with the secure identifier may eliminate the need to send target audience member PII to advertisers, thus mitigating and/or eliminating a black market for target audience member PII.

Protecting secure identifiers can limit black market value. Thus, in an embodiment, the method may further include disabling use of the secure identifier after a defined period of time following the generating of the secure identifier. In some examples, limiting lifetimes of secure identifiers may mitigate, and in many cases eliminate, a black market for secure identifiers. Further, expiring secure identifiers may increase security of secure identifiers by limiting a validity period the secure identifier is usable by a malicious party. In some embodiments, advertisers may use the secure identifiers only one-time. In some examples, advertisers may use the secure identifiers multiple times. In another example, the method may include disabling use of the secure identifier in response to a triggered condition of a smart contract. In some embodiments, smart contracts between advertisers and publishers may specify conditions under which use of a secure identifier and/or access to target audiences must be disabled and/or revoked. For example, when data used to create audiences has been revoked or was otherwise not obtained in manners compliant with smart contracts, secure identifiers and/or access to associated target audiences may be automatically disabled. In some embodiments, disabling use of secure identifiers results in disabling access to target audiences associated with the secure identifiers.

As detailed herein, the steps outlined in method 100 in FIG. 1 may enable cryptographically generating custom audiences. In some examples, the provided techniques may store, validate, and control access to advertising-related information, such as advertising targeting information, using blockchain techniques. By doing so, the systems and methods described herein may improve the security of computing devices by eliminating or minimizing secondary markets (i.e., black markets) for user identifiers. Further, the systems and methods described herein may improve the security of computing devices by minimizing an amount of audience members' (e.g., users) personally identifiable identification (PII) that is provided to advertisers. As such, the provided techniques may advantageously protect audience members by beneficially reducing occurrences of theft, use, and dissemination of PII by unauthorized parties as a result of unauthorized access to PII by unauthorized parties.

FIG. 2 is a block diagram of an example system 200 for cryptographically generating custom audiences. As illustrated in this figure, example system 200 may include one or more modules 210 for performing one or more tasks. As is explained in greater detail herein, modules 210 may include accessing module 212, ascertaining module 214, generating module 216, and/or committing module 218. Although illustrated as separate elements, one or more of modules 210 in FIG. 2 may represent portions of a single module or application.

In certain embodiments, one or more of modules 210 in FIG. 2 may represent one or more software applications or programs that, when executed by a computing device, may cause the computing device to perform one or more tasks. For example, and as is described in greater detail herein, one or more of modules 210 may represent modules stored and configured to run on one or more computing devices, such as the devices illustrated in FIG. 3 (e.g., computing device 302 and/or server 306). One or more of modules 210 in FIG. 2 may also represent all or portions of one or more special-purpose computers configured to perform one or more tasks.

As illustrated in FIG. 2, example system 200 may also include one or more storage devices, such as data storage device 220. Data storage device 220 generally represents any type or form of volatile or non-volatile storage device or medium capable of storing data and/or computer-readable instructions. In one example, data storage device 220 may store, load, and/or maintain information relating to one or more of immutable distributed ledger 221 (e.g., blockchain data), record 222, information describing characteristics of a target audience 223, update transaction 224, target audience member identifier 225, information describing characteristics of a target audience member 226, secure identifier 227, and/or advertiser identifier 228. Examples of data storage device 220 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 210 stored in memory 240. Additionally or alternatively, physical processor 230 may execute one or more of modules 210 to facilitate cryptographically generating custom audiences. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 210. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 200 in FIG. 2 may be implemented in a variety of ways. For example, all or a portion of example system 200 may represent portions of example system 300 in FIG. 3. As shown in FIG. 3, system 300 may include a computing device 302 in communication with a server 306 via a network 304. In one example, all or a portion of the functionality of modules 210 may be performed by computing device 302, server 306, and/or any other suitable computing system. As will be described in greater detail below, one or more of modules 210 from FIG. 2 may, when executed by at least one processor of computing device 302 and/or server 306, enable computing device 302 and/or server 306 to cryptographically generate custom audiences. For example, and as will be described in greater detail below, one or more of modules 210 may cause computing device 302 and/or server 306 to (1) access from record 222 stored in immutable distributed ledger 221, information describing characteristics of a target audience 223, (2) ascertain target audience member identifier 225 by matching information describing characteristics of the target audience member 226 with information describing characteristics of the target audience 223, (3) generating unique and encrypted secure identifier 227 linking advertiser identifier 228 to target audience member identifier 225, and (4) committing secure identifier 227 to immutable distributed ledger 221 as update transaction 224 to record 222.

Computing device 302 generally represents any type or form of computing device capable of reading computer-executable instructions. For example, computing device 302 may represent an endpoint device running software. Additional examples of computing device 302 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 304 generally represents any medium or architecture capable of facilitating communication or data transfer. In one example, network 304 may facilitate communication between computing device 302 and server 306. In this example, network 304 may facilitate communication or data transfer using wireless and/or wired connections. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 306 generally represents any type or form of computing device that reads computer-executable instructions. For example, server 306 may represent a server running software. Additional examples of server 306 include, without limitation, social media servers, security servers, application servers, web servers, storage servers, and/or database servers configured to run certain software applications and/or provide various security, web, storage, and/or database services. Although illustrated as a single entity in FIG. 3, server 306 may include and/or represent a plurality of servers that work and/or operate in conjunction with one another.

FIG. 4 depicts a block diagram of an immutable distributed ledger 400 capable of being used as a part of the disclosed techniques for cryptographically generating custom audiences. The systems and methods described herein are directed to logging data to an immutable distributed ledger (e.g., a blockchain). Creating an immutable record of transactions that occur with specific data may provide a computationally verifiable mechanism to prove the provenance of data being used. Generating a verifiable digital trail may be created to reflect the storage, validation, and access of data may protect against the data being improperly managed or used or otherwise distributed without the appropriate permissions.

In some examples, immutable distributed ledger 400 may be stored and/or maintained in multiple physical storage devices such as, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage device. In some examples, the physical storage devices may be a part of and/or coupled to one or more devices described in FIGS. 2-3.

Immutable distributed ledger 400 may be distributed by storing copies of the immutable distributed ledger 400 on two or more different physical storage devices. In some embodiments, the two or more different physical storage devices may be a part of and/or coupled to computing devices, also known as node devices, located at different physical locations. Thus, each different physical storage device and each node device may store the entire immutable distributed ledger 400 at any time. As new transactions add new blocks to the immutable distributed ledger 400, the transactions may be broadcast to all node devices for storage.

Immutable distributed ledger 400 may be a distributed database that includes chained blocks of information in a record (e.g., record 222), such as block "N" 402, block "N–1" 404, and block "N–2" 406. A block in the immutable distributed ledger 400 may be chained (i.e., linked) by a reference to a previous block in the chain as is depicted in FIG. 4. Thus, with the exception of the first block in the chain (i.e., a genesis block), each block may include information identifying and referring to an immediately prior block in the chain.

Blocks may include a wide variety of information. In some examples, a block may include information describing: a prior block hash, a block identifier (e.g., a proof of work hash), a Merkel tree root, a transaction list, a nonce, a timestamp, and/or a payload. In some embodiments, blocks may include a block header that includes the prior block hash, the proof of work hash, and the Merkel tree root. In some embodiments, a hash function may encrypt and condense input data of an arbitrary length to an output having a fixed length. In some examples, hash functions may be applied to outputs of hash functions. For example, a block header may be hashed twice with a SHA256 algorithm by applying the SHA256 hash algorithm to an input to create an intermediate value and then applying the SHA256 hash algorithm to the intermediate value to create an output.

In some examples, blocks may include the prior block hash that identifies and refers to the immediately prior block in the chain. Thus, the prior block hash links a current block to the prior block. When a strong one-way cryptographic hash function is used to create the prior block hash and the proof of work hash, attempts to change information in a prior block result in changing respective proof of work hashes of subsequent blocks in the chain. Thus, a third-party having access to an output of a hash function stored in blocks in the chain but not having the corresponding input to the hash function will not be able to determine the corresponding input without implementing a prohibitive quantity of resources.

In some examples, blocks may include the block identifier, such as the proof of work hash that identifies the current block. No two blocks have the same block identifier. Proof of work hashes may include results of cryptographic hashes of payload information with prior block hashes of immediately prior blocks. In some embodiments, proof of work hashes including results of cryptographic hashes of payload information with prior block hashes of immediately prior blocks may form the proof of work. In some embodiments, proof of work hashes may be a hash of information including, for example, time stamps, nonces, at least a portion of a payload, and/or difficulty indicators.

In some examples, blocks may include a transaction list and/or a transaction summary such as a Merkel tree root and/or a binary hash tree. Transaction lists and transaction summaries may be valuable, as they may be used to verify authenticity of a transaction and/or information in a block. If only one transaction in the chain changes, then the subsequent transaction lists and transaction summaries change. Comparing transaction lists and transaction summaries may identify attempts to alter transactions and/or information in blocks. Including transaction lists and/or transaction summaries in blocks makes blockchain fraud extremely difficult, as changing information in one block and successfully passing verification requires changing not only that block, but also all other copies of that block and all subsequent blocks on all computing devices storing the distribute immutable ledger.

In some examples, Merkel tree roots may be created by recursively hashing pairs of transactions until there is only one hash result remaining—the Merkel tree root. This recursive hashing may include double hashing the input transaction information. In cases where there is an odd number of transactions, the last transaction in the chain may be duplicated while creating the Merkel tree root.

In some examples, blocks may include information describing payloads. In some embodiments, payloads may include information describing: secure identifiers generated by a method described herein, information sent between a publisher and an advertiser, digital assets, transaction data, schema information describing organization of the blockchain, encrypted messages, digital signatures, cryptographic keys, and/or cryptographic certificates. In some embodiments, payloads may include results of cryptographic hashes of other payload information with prior block hashes of immediately prior blocks.

In some examples, each node device may verify candidate transactions and/or the veracity of the entire immutable distributed ledger 400 by performing the hash function against information stored in blocks of the immutable distributed ledger 400. Further, when a candidate transaction is verified, verification failure by any node device prohibits the candidate transaction. Thus, no single node device storing the entire immutable distributed ledger 400 is a point at which the entire immutable distributed ledger 400 may be compromised.

Example hashing functions that may be used to perform at least a portion of the techniques described hereby include, and are not limited to, functions such as SHA-224, SHA-256, SHA-384, SHA-512, SHA-512/224, SHA-512/256 and functions described in the National Institute of Standards and Technology (NIST) Federal Information Processing Standards Publications (FIPS PUBS) No. 180-4 "Secure Hash Standard," which is incorporated herein by reference in its entirety.

Example cryptography functions that may be used to perform at least a portion of the techniques described hereby include, and are not limited to, functions such as those described in the NIST FIPS PUBS No. 186-4 "Digital Signature Standard," which is incorporated herein by reference in its entirety.

As detailed herein, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Although illustrated as separate elements, the modules described and/or illustrated herein may represent portions of a single module or application. In addition, in certain embodiments one or more of these modules may represent one or more software applications and/or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive information describing characteristics of a target audience to be transformed, transform the information describing characteristics of a target audience, output a result of the transformation to generate a unique and encrypted secure identifier linking an advertiser identifier to the target audience member identifier, use the result of the transformation to generate a unique and encrypted secure identifier linking an advertiser identifier to the target audience member identifier, and store the result of the transformation as an update transaction to a record stored in an immutable distributed ledger. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps may not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, comprising:
    accessing, by a computing device and from a record stored by an advertiser in an immutable distributed ledger, information describing characteristics of a target audience;
    ascertaining a target audience member identifier of a target audience member by matching information describing characteristics of the target audience member with the information describing characteristics of the target audience;
    generating a unique and encrypted secure identifier linking an advertiser identifier associated with the advertiser to the target audience member identifier; and
    committing the secure identifier to the immutable distributed ledger as an update transaction to the record.

2. The computer-implemented method of claim 1, wherein the immutable distributed ledger implements a blockchain methodology configured to store a history of transactions.

3. The computer-implemented method of claim 1, further comprising receiving, from a second computing device, an instruction to initiate the accessing.

4. The computer-implemented method of claim 1, wherein the information describing characteristics of the target audience is personally identifiable identification of the target audience.

5. The computer-implemented method of claim 1, wherein the information describing characteristics of the target audience is encrypted with a cryptographic key.

6. The computer-implemented method of claim 1, wherein the secure identifier is cryptographically signed by the computing device.

7. The computer-implemented method of claim 1, further comprising sending, to a second computing device, a communication indicating storing of the secure identifier as the update transaction.

8. The computer-implemented method of claim 1, further comprising disabling use of the secure identifier at least one of:
    after a defined period of time following the generating of the secure identifier; or
    in response to a triggered condition of a smart contract.

9. The computer-implemented method of claim 1, wherein the secure identifier includes information describing at least one of:
    the target audience member identifier;
    row-level personally identifiable identification describing characteristics of the target audience;
    the advertiser identifier;
    an expiration date of the secure identifier; or
    a digital signature.

10. The computer-implemented method of claim 1, wherein
    generating the unique and encrypted secure identifier further includes hashing the target audience member identifier with the advertiser identifier to form the secure identifier.

11. The computer-implemented method of claim 1, further comprising:
    receiving, from a second computing device, a request for an access transaction to grant access to the record;
    sending, to a plurality of node devices of a validation network, a request to validate the access transaction;
    receiving responses from the plurality of node devices of the validation network;
    denying the access transaction when any response indicates the access transaction is invalid; and
    executing the access transaction when all responses indicate the access transaction is valid.

12. The computer-implemented method of claim 11, further comprising:
    receiving, when the access transaction is valid and from the second computing device, the target audience member identifier and a request to send an advertisement to the target audience member associated with the target audience member identifier; and
    sending the advertisement to a user device of the target audience member.

13. A system, comprising:
    a computing device having a memory;
    an accessing module, stored in the memory, that accesses information describing characteristics of a target audience from a record stored by an advertiser in an immutable distributed ledger;
    an ascertaining module, stored in the memory, that ascertains a target audience member identifier of a target audience member by matching information describing characteristics of the target audience member with the information describing characteristics of the target audience;
    a generating module, stored in the memory, that generates a unique and encrypted secure identifier linking an advertiser identifier associated with the advertiser to the target audience member identifier; and
    a committing module, stored in the memory, that commits the secure identifier to the immutable distributed ledger as an update transaction to the record.

14. The system of claim 13, wherein the information describing characteristics of the target audience is personally identifiable identification of the target audience.

15. The system of claim 13, further comprising a disabling module, stored in the memory, that disables use of the secure identifier at least one of:
   after a defined period of time following the generating of the secure identifier; or
   in response to a triggered condition of a smart contract.

16. The system of claim 13, wherein the secure identifier includes information describing at least one of:
   the target audience member identifier;
   row-level personally identifiable identification describing characteristics of the target audience;
   the advertiser identifier;
   an expiration date of the secure identifier; or
   a digital signature.

17. A non-transitory computer-readable medium, comprising:
   computer-readable instructions that, when executed by at least one processor of a computing device, cause the computing device to:
   access from a record stored by an advertiser in an immutable distributed ledger, information describing characteristics of a target audience;
   ascertain a target audience member identifier of a target audience member by matching information describing characteristics of the target audience member with the information describing characteristics of the target audience;
   generate a unique and encrypted secure identifier linking an advertiser identifier associated with the advertiser to the target audience member identifier; and
   commit the secure identifier to the immutable distributed ledger as an update transaction to the record.

18. The non-transitory computer-readable medium of claim 17, wherein the information describing characteristics of the target audience is personally identifiable identification of the target audience.

19. The non-transitory computer-readable medium of claim 17, wherein the computer-readable instructions, when executed by the at least one processor of the computing device, further cause the computing device to disable use of the secure identifier at least one of:
   after a defined period of time following the generating of the secure identifier; or
   in response to a triggered condition of a smart contract.

20. The non-transitory computer-readable medium of claim 17, wherein the secure identifier includes information describing at least one of:
   the target audience member identifier;
   row-level personally identifiable identification describing characteristics of the target audience;
   the advertiser identifier;
   an expiration date of the secure identifier; or
   a digital signature.

* * * * *